United States Patent [19]

Saruwatari et al.

[11] Patent Number: 5,037,587
[45] Date of Patent: Aug. 6, 1991

[54] PREPARATION PROCESS OF POLYIMIDE FILM

[75] Inventors: Masumi Saruwatari; Yasuhiko Ohta; Yasuhiro Fujii, all of Nagoya; Yasuko Honji, Ichinomiya; Shoichi Tsuji, Tanashi; Shinobu Moriya, Nagoya, all of Japan

[73] Assignee: Mitsui Toatsu Chemicals, Inc., Tokyo, Japan

[21] Appl. No.: 549,149

[22] Filed: Jul. 6, 1990

[51] Int. Cl.⁵ .............................................. B29C 71/00
[52] U.S. Cl. ................................... 264/22; 264/210.1; 264/211.18; 264/216; 264/237; 264/348
[58] Field of Search .............. 264/348, 237, 22, 176.1, 264/210.1, 211.13, 331.19, 211.18, 216

[56] References Cited

FOREIGN PATENT DOCUMENTS

| 37-6124 | 6/1962 | Japan . |
| 51-38359 | 3/1976 | Japan .................................. 264/237 |
| 62-205124 | 9/1987 | Japan . |
| 62-290515 | 12/1987 | Japan . |

*Primary Examiner*—Hubert C. Lorin
*Attorney, Agent, or Firm*—Burns, Doane, Swecker & Mathis

[57] ABSTRACT

In the preparation of a film by melt-extrusion process of thermoplastic polyimide, static charge is applied to a molten film, primary cooling is carried out by adhering the film to a cooling roller having a surface temperature in the range of from the glass transition temperature of said polyimide $-50°$ C. to the glass transition temperature $-15°$ C., the film is successively cooled to $60°$ C. and less without bringing the film into contact with rollers, and is taken up under tension to give a polyimide film.

6 Claims, No Drawings

PREPARATION PROCESS OF POLYIMIDE FILM

BACKGROUND OF THE INVENTION

1. Field of the Invention

The present invention relates to a process for the preparation of a film essentially consisting of thermoplastic polyimide. More particularly, the invention relates to a preparation process of a thermoplastic polyimide film comprising cooling a molten film under specific conditions and taking-up the film under tension in an extrusion process.

2. Description of the Prior Art

Industrial machinery in various fields has recently been directed toward miniaturization and weight reduction. The parts for constituting the machinery are also required to have reliability over prolonged periods in the areas of heat resistance, mechanical properties and dimensional stability. Plastic films used for the above industrial machinery are also required to have the above performance.

At present, film materials having the highest heat-resistance designed to meet the above requirement are various polyimide films such as Upilex ™ (a product of Ube Industries Co. Ltd.) and Kapton ™ (a product of E. I. Du Pont De Nemours & Co.). Since hot molding of the above polyimide is difficult, films are prepared by a so-called solution casting method where a polyamic acid precursor solution is cast and heat-treated to form a polyimide film.

On the other hand, hot-moldable polyimides such as polyetherimide and polyimide which are disclosed in Japanese Patent Laid-Open Publication SHO No. 62-205124(1987) have been developed. Using the thermoplastic polyimide, films can be prepared by a so-called extrusion process where polyimide is heat-melted in an extruder and the molten polyimide delivered from a die is cooled solidified by contact with a cooling roller.

In order to obtain high quality film by an extrusion process, adhesion of the molten film to the cooling roller is important in the cooling and solidifying step of the extruded molten material from the die.

The methods for improving adhesion include:

(1) A method for blowing air out of a slit nozzle (air knife method).

(2) A method for mechanically pressing the molten film with a rubber roller at the contact point of the molten film with the cooling roller (rubber roller method).

(3) A method for applying static charge to the molten film and electrostatically influencing the film into close contact with the cooling roller (static charge application method).

However, in the extrusion process of the above thermoplastic polyimide, the air knife method has a drawback in that it is difficult to evenly provide the whole film with sufficient pressure to uniformly adhere the molten film to the cooling roller. Consequently, cooling becomes non-uniform and has caused problems such as defects in flatness and spot variation in the thickness of the solidified film.

As to the rubber roller method, for example, Japanese Patent Laid-Open Publication SHO No. 62-290515(1987) discloses a method for assuming the glass transition point (Tg) of the resin to be processed as the reference temperature, setting the surface temperature of the cooling roller in the range of (Tg)−50° to (Tg)−10° C., and nipping the film with a rubber roller having a surface hardness of 70 degrees or less under a specific range of linear pressure. However, the rubber roller deforms during use even though the roundness of the roller is extremely accurate in the initial stage, which leads to irregularity in linear pressure of the rubber roller and has caused problems such as spot variation in the thickness of the film.

As to the static charge application method, for example, Japanese Patent Publication HEI No. 1-53620(1989) describes a method for preparing an amorphous film having low optical strain by applying static charge to a molten film, uniformly adhering the film to a cooling roller having a temperature of the glass transition point (Tg)−10° C. and transmitting the film without tension by using a second roller having a slightly lower peripheral speed then that of the cooling roller. The static charge application method provides good adhesion of the film to the cooling roller. In the method, however, it is difficult to maintain flatness of the film and to prevent generation of creases because electrostatically adhered film is released from the cooling roller without tension.

Further, the film obtained has been defective in that very small flaws are observed over the whole surface of the film.

SUMMARY OF THE INVENTION

One object of the present invention is to provide a process for preparing a film without spot variation in thickness and flaws by melt-extruding a thermoplastic polyimide with an extruder and uniformly adhering the molten film delivered from a die to a cooling roller.

The present inventors have carried out an intensive investigation in order to achieve the above object and have completed the present invention.

That is, one aspect of the present invention is a process for the preparation of a polyimide film by melt-extrusion of a thermoplastic polyimide, comprising the steps of applying static charge to a molten film, conducting primary cooling by adhering the molten film to a cooling roller having a surface temperature in the range of from the glass transition temperature of said polyimide −50° C. to the glass transition temperature of said polyimide −15° C., and successively taking-up the film under tension while cooling the film to the room temperature without bringing the film into contact with rollers.

According to the preparation process of polyimide film in the invention, troubles in the film forming steps can be eliminated by specifying the cooling conditions of the molten film, and a film without defects in on flatness or scuffmarks can be obtained. Further, a practical film can be prepared which has heat resistance and is melt-processable and excellent in thermal and mechanical properties. That is, the process of the present invention is very effective for the production of heat resistant plastic films which have always been demanded as industrial materials in the market.

DESCRIPTION OF THE PREFERRED EMBODIMENTS

The present invention will hereinafter be illustrated further in detail.

The polyimide used in the present invention is a thermoplastic polyimide selected from already known heat-resistant polyimides having recurring structural units represented by the formula (V):

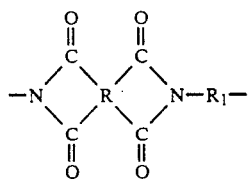
(V)

wherein R and R₁ are radicals selected from the group consisting of an aliphatic radical having at least two carbon atoms, alicyclic radical, monoaromatic radical, condensed polyaromatic radical, and a non-condensed polyaromatic radical wherein aromatic radicals are connected with each other through a direct bond or a bridge radical, R is a tetravalent radical, and R₁ is a divalent radical. Preferred polyimides are represented by the formula (I) and the formula (III).

That is, the thermoplastic polyimide which is preferably used in the invention has recurring structural units represented by the formula (I):

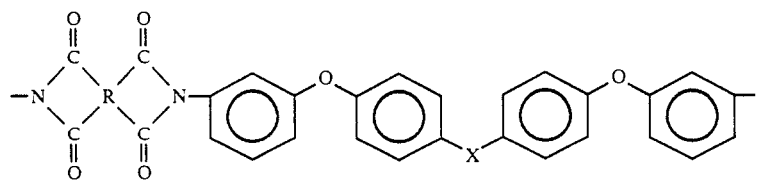
(I)

wherein R is a tetravalent radical selected from the group consisting of an aliphatic radical having at least two carbon atoms, alicyclic radical, monoaromatic radical, condensed polyaromatic radical, and a non-condensed polyaromatic radical wherein aromatic radicals are connected with each other through a direct bond or a bridge radical, and x is a single bond, sulfur atom or a divalent radical selected from sulfone, carbonyl, isopropylidene or hexafluoroisopropylidene; or has recurring structural units represented by the formula (III):

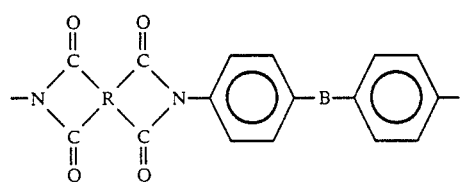
(III)

wherein B is a sulfur atom, oxygen atom, or a divalent radical selected from sulfone, methylene, ethylidene, isopropylidene or hexafluoroisopropylidene, and R is represented by the formula (IV):

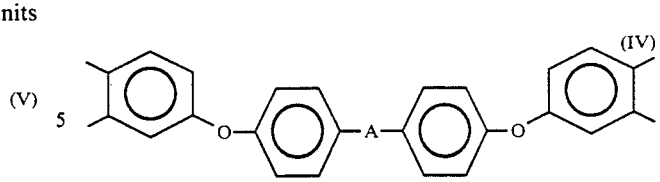
(IV)

wherein A is a sulfur atom or a divalent radical selected from sulfone, methylene, ethylidene, isopropylidene or hexafluoroisopropylidene.

Exemplary preferred polyimides have a recurring structural unit of the above formula (I) wherein R is

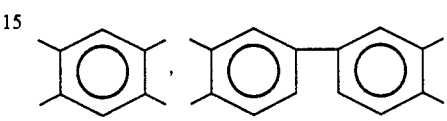

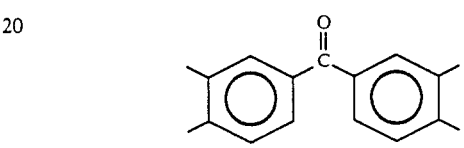

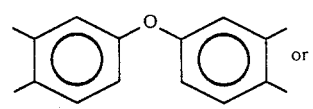 or

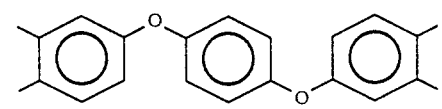

An especially preferred polyimide has the recurring structural unit of formula (II)

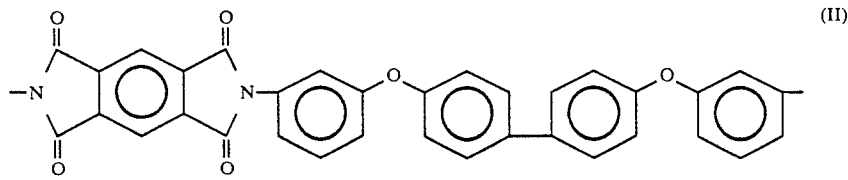
(II)

The above polyimides can be prepared by the dehydrationcondensation reaction of aromatic tetracarboxylic acid dianhydride with aromatic diamine.

The aromatic tetracarboxylic acid dianhydrides used for the preparation of the polyimide include, for example,
butanetetracarboxylic dianhydride,
cyclopentanetetracarboxylic dianhydride,
pyromellitic dianhydride,
1,2,3,4-benzenetetracarboxylic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride, 3,4,9,10-perylenetetracarboxylic dianhydride,
2,3,6,7-anthracenetetracarboxylic dianhydride,
1,2,7,8-phenanthrenetetracarboxylic dianhydride,
3,3',4,4'-biphenyltetracarboxylic dianhydride,
2,2',3,3'-biphenyltetracarboxylic dianhydride,
3,3',4-4'-benzophenonetetracarboxylic dianhydride,
2,2',3,3'-benzophenonetetracarboxylic dianhydride,
2,2-bis(3,4-dicarboxyphenyl)propane dianhydride,
2,2-bis(2,3-dicarboxyphenyl)-propane dianhydride,
bis(3,4-dicarboxyphenyl) ether dianhydride,
bis(2,3-dicarboxyphenyl) ether dianhydride,
bis(3,4-dicarboxyphenyl) sulfone dianhydride,
bis(2,3-dicarboxyphenyl) sulfone dianhydride,
2,2-bis(3,4-dicarboxyphenyl)-1,1,1,3,3,3-hexafluoropropane dianhydride,
2,2-bis(3,4-dicarboxyphenyl)-1,1,1,3,3,3-hexachloropropane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
4,4'-(p-phenylenedioxy)-diphthalic dianhydride,
4,4'-(m-phenylenedioxy)diphthalic dianhydride,
4,4'-diphenylsulfidedioxybis(4-phthalic acid) dianhydride,
4,4'-diphenylsulfonedioxybis(4-phthalic acid) dianhydride,
methylenebis(4-phenyleneoxy-4-phthalic acid) dianhydride, ethylidenebis(4-phenyleneoxy-4-phthalic acid) dianhydride, isopropylidenebis-(4-phenyleneoxy-4-phthalic acid) dianhydride, and hexafluoroisopropylidenebis-(4-phenyleneoxy-4-phthalic acid) dianhydride.

Exemplary aromatic diamines suitable for use in the preparation of the polyimide include bis [4-(3-aminophenoxy)-phenyl] sulfide,
bis [4-(3-aminophenoxy)phenyl] sulfone,
bis [4-(3-aminophenoxy)phenyl] ketone,
4,4'-bis(3-aminophenoxy)biphenyl,
2,2-bis [4-(3-aminophenoxy)phenyl]-propane,
2,2-bis [4-(3-aminophenoxy)phenyl]-1,1,1,3,3,3-hexafluoropropane,
4,4'-diaminodiphenyl sulfide, 4,4'-diaminodiphenyl ether,
4,4'-diaminodiphenyl sulfone, 4,4'-diaminodiphenylmethane,
1,1-di(p-aminophenyl)ethane, 2,2-di(p-aminophenyl)-propane, and
2,2-di(p-aminophenyl)-1,1,1,3,3,3-hexafluoropropane.

The above aromatic tetracarboxylic acid dianhydride and aromatic diamine are used singly or as a mixture, respectively.

The polyimide for use in the process of the invention can be prepared from the aromatic tetracarboxylic acid dianhydride and aromatic diamine by a commonly known method. For example, the dianhydride and the diamine can be suspended or dissolved in an organic solvent as a mixture or separately and can be reacted to form the polyamic acid, which is thermally or chemically dehydrated and the product is separated and purified.

The polyimide used in the process of the invention is heat-melted with a known extruder, delivered in the form of a film from a die having a slit nozzle, a static charge is applied to the film, the film is cooled and solidified with a cooling roller having a surface temperature in the range of glass transition temperature(Tg) of the polymer (Tg)−50° to (Tg)−15° C., transmitted under tension without bringing the film into contact with rollers while further cooling to the room temperature, and wound up or transfered to a further step.

The polyimide used in the process of the present invention has a melt viscosity in the range of preferably from 500 to 100,000 poise.

When the melt viscosity is less than 500 poise, the molten film lacks tensile strength due to melt elasticity and it is difficult to bring the film into uniform contact with the cooling roller. A melt viscosity exceeding 100,000 poise gives an adverse effect on the melt flowability of the film and causes unfavorable problems such as film breakage resulting from pulling by the cooling roller.

Application of a static charge to the molten film in the process of the invention is carried out by common methods as disclosed in for example, Japanese Patent Publication SHO No. 37-6124(1962). Using a wire or a knife edge as an electrode, a positive or negative D.C. electric field is applied so as to obtain an electric potential gradient of at least 30 kV/cm in the immediate neighborhood of the electrode. Thus a state of corona discharge or glow discharge is established around the electrode and gas molecules in the atmosphere (generally in the air) are ionized and the film is electrostatically charged.

Practical methods include, for example, application of a positive or negative D.C. voltage of 5 to 30 kV to a tungsten wire having a diameter of 0.05 to 0.5 mm.

The cooling roller used for the process of the invention has a surface layer of, for example, metal or ceramic and can be heated by passing heating medium such as oil, water, and low melting point inorganic material through the interior of the roller.

The surface temperature is determined depending upon the glass transition temperature (Tg) of the polyimide used and is preferably in the range of (Tg)−50° to (Tg)−15° C.

Even though a sufficient amount of static charge is provided for the molten film, a temperature lower than (Tg)−50° C. causes abnormal deformation at the moment when the film comes into contact with the cooling roller and unfavorably results in a rippled film. When the surface temperature of the cooling roller exceeds (Tg)−15° C., elasticity of the film is decreased even though static charge is provided and adhesion is sufficient. Consequently, the film is partially stretched by tension when it is released from the cooling roller and unfavorably leads to processing troubles such as generation of internal stress, formation of creases, and in certain cases, wrapping on the cooling roller.

The glass transition temperature can be determined by differential thermal analysis, dilatometry, mechanical loss in viscoelasticity and dielectric loss.

The film that has been primarily cooled to a little lower temperature of the glass transition temperature of polyimide is released from the cooling roller by tension, and then cooled to 60° C. or less, preferably to the room temperature and wound up or transfered to a following step.

In the above secondary cooling step which cools the film to the room temperature or to 60° C. or less, it is unfavorable to bring the whole or most part of the film width direction into contact with rollers because scuffmarks occur in the film. A scuffmark is a kind of flaw which occurs on the film surface by sliding friction between the film and rollers. A scuffmark has generally a length of 1 to 3 mm in the direction which is parallel to the film flow direction at the center of the film and is rectanglar to the film flow direction at the edge of the film. For example, when the film comes into contact with a roller in the course of the cooling step, scuffmarks occur as a result of film shrinkage on the roller. Particularly in the case of high Tg polyimide, a film having a broad width, a roller having a large diameter, or high tension, scuffmarks are unfavorably liable to take place. Only the edge face of the film may be brought into contact with a guide or grasped with a clip in the secondary cooling step.

When the above cooling roller has an uneven surface in order to provide irregularity on the film surface, flaws in the film are not so remarkable even though the film comes into contact with the rollers in the course of the secondary cooling step.

The present invention will hereinafter be illustrated further in detail by way of examples.

Polyimide 1

A reaction vessel equipped with a stirrer, reflux condenser and a nitrogen inlet tube, 3.68 kg (10 moles) of 4,4'-bis(3-aminophenoxy) biphenyl and 25 kg of N,N-dimethylacetamide were charged and 2.14 kg (9.80 moles) of pyromellitic dianhydride was added by portions under nitrogen atmosphere with caution to prevent temperature rise of the solution. Successively 59 g (0.4 mole) of phthalic anhydride was added and stirred for 20 hours at the room temperature. To the resultant mixture, 303 g (3 moles) of triethylamine and 306 g (3 moles) of acetic anhydride were added over about 50 minutes and stirred for about 2 hours. The reaction mixture obtained was mixed with 20 kg of methanol. Precipitated polyimide was filtered at 30° C., washed with methanol and acetone, and dried at 300° C. for 8 hours in the nitrogen atmosphere to obtain about 5 kg of polyimide powder. The melt viscosity of the polyimide was measured with a KOKA-type flowtester (Trade Mark; CFT-500, a product of Shimadzu Seisakusho Co. Ltd.). The apparent viscosity of the polyimide thus obtained was 5500 poise at an apparent shear rate of 200 sec$^{-1}$ at 400° C.

The polyimide powder obtained was dried at 180° C. for 24 hours, melted at 410° C. in a 25 mm vented extruder delivered from a nozzle of 2 mm in diameter and allowed to cool. The resulting strand having a diameter of about 1.8 mm was cut into pellets of 3 mm in length. The polyimide resin pellets thus obtained had a melt viscosity of 5600 poise at 400° C. at a shear rate of 200$^{-1}$ sec. The glass transition temperature was 248° C. by DSC method at a rate of temperature increase of 4° C./min.

Polyimides 2 to 6

The same procedures as conducted for obtaining Polyimide 1 were carried out using the tetracarboxylic dianhydrides and aromatic diamines as illustrated in Table 1. (Tg) and melt viscosity of each polyimide pellet thus obtained are illustrated in Table 1.

EXAMPLE 1

The pellets of Polyimide 1 were dried at 180° C. for 24 hours in a hot air drying oven. The dried pellets were charged to a 40 mm extruder, heat-melted at 400° C., extruded through a slit die having a width of 500 mm and an opening of 1 mm, and the extruded film was taken-up at a rate of 3 m/min with a cooling roller having a diameter of 400 mm and a surface temperature of 220° C. In this step, a tungsten wire of 0.2 mm in diameter was stretched parallel to the roller axis at the position where is 15 mm apart from the contact point of film and cooling roller in the perpendicular direction of the film surface. Both ends of the wire were fixed on insulators. To the electrode thus obtained, a voltage of +10 kV was applied with a high voltage D.C. power source (Trade Mark; KFV-3010, a product of Kasuga Electric Co. Ltd.). The molten film was uniformly adhered to the cooling roller and the film temperature on the cooling roller surface was 218° C.

The contact angle of the film to the cooling roller was about 110 degrees. The film was released from the roller by pulling backward with a tension of 5 kgf, allowed to cool over about 2 m without contact with a roller and wound up. The film temperature directly before winding was about 60° C. No scuffmarks were found on the film surface.

EXAMPLE 2 AND COMPARATIVE EXAMPLE 1

A film was prepared by carrying out the same procedures as conducted in Example 1. However, the temperature of the cooling roller was gradually lowered in order to examine adhesion of the film to the cooling roller. Uniform adhesion could be achieved until the surface temperature of the cooling roller was decreased to about 200° C. When the surface temperature was further decreased to less than 200° C. for the purpose of comparison the adhesion of the film became uneven and rippled creases were observed.

EXAMPLE 3 AND COMPARATIVE EXAMPLE 2

A film was prepared by carrying out the same procedures as conducted in Example 1. However, the temperature of the cooling roller was gradually raised from 220° to 250° C. in order to examine the film with respect to the adhesion to and the releaseability from the cooling roller. Film adhesion to the cooling roller was good irrespective of the roller temperature. On the other hand, uniform release from the cooling roller along the width direction of the film could be achieved until the surface temperature of the cooling roller was increased to about 235° C.

When the surface temperature of the cooling roller exceeded 235° C. for the purpose of comparison, the film became difficult to release from the cooling roller. When the tension was increased to 10 kgf under such circumstances, the film was deformed and poor flatness resulted.

COMPARATIVE EXAMPLE 3

The film was prepared by carrying out the same procedures as conducted in Example 1 except that the high voltage D.C. power source was turned off in the course of the extruding operation. The film could not adhere to the cooling roller at all and the resulting film was poor in flatness and had large variation in thickness.

COMPARATIVE EXAMPLE 4

The film was prepared by carrying out the same procedures as conducted in Example 1 except that the tension for releasing the film from the cooling roller was gradually lowered. When the tension was decreased to 0.2 kgf or less, release of the film from the cooling roller became non-uniform and the film was twisted.

COMPARATIVE EXAMPLE 5

A metal roller having a surface temperature adjusted to 150° C., a diameter of 300 mm and the same peripheral speed as the cooling roller was fitted on the equipment used in Example 1, at the position having a core to core spacing of 750 mm to the cooling roller, so as to obtain an contact angle of 180 degrees to the film.

The film was prepared by carrying out the same procedures as conducted in Example except that secondary cooling of the film to 60° C. was carried out by contact with the metal roller. The film thus obtained had many fine scuffmarks on the surface.

EXAMPLES 4 TO 8

Films were prepared from polyimides 2-6 which are illustrated in Table 1 by carrying out the same procedures as conducted in Example 1 except that heat-melting temperature and surface temperature of the cooling roller were set as illustrated in Table 2.

In all cases, film adhesion to the cooling roller was good, the films obtained had good flatness, and no scuffmarks were observed on the surface of films. Results are illustrated in Table 2.

EXAMPLE 9

Polyetherimide (Trade Mark; ULTEM 1000, a product of General Electric Co.) was dried at 150° C. for 24 hours and charged to the extruder. The film was prepared by carrying out the same procedures as conducted in Example 1 except that heat-melting temperature was 355° C. and temperature of the cooling roller was 200° C.

The film thus obtained had good flatness and no scuffmark was observed on the surface of the film.

TABLE 1

| Polyimide pellet | Starting material Tetracarboxylic acid dianhydride | Diamine | Tg (°C.) | Melt viscosity (poise) (temperature °C.) |
|---|---|---|---|---|
| 2 | Pyromellitic dianhydride | 2,2-Bis(3-aminophenoxyphenyl)-1,1,1,3,3,3-hexafluoropropane | 248 | 4900 (400) |
| 3 | 3,3',4,4'-Biphenyltetracarboxylic dianhydride | 4,4'-Bis(3-aminophenoxy)benzophenone | 229 | 4000 (370) |
| 4 | 3,3',4,4'-Benzophenonetetracarboxylic dianhydride | 4,4'-Bis(3-aminophenoxyphenyl) sulfone | 238 | 4800 (380) |
| 5 | 3,3',4,4'-Diphenylethertetracarboxylic dianhydride | 4,4'-Bis(3-aminophenoxyphenyl) sulfide | 175 | 5000 (350) |
| 6 | p-Phenylenedioxy-di(4-phthalic acid) dianhydride | 4,4'-Bis(3-aminophenoxy)benzophenone | 195 | 2500 (360) |

TABLE 2

| Example | Polyimide pellet No. | Heat-melting temperature (°C.) | Cooling roller temperature (°C.) | Cooling roller Adhesion | Cooling roller Releaseability | Cooling roller Flatness | Scuffmark |
|---|---|---|---|---|---|---|---|
| 4 | 2 | 400 | 228 | good | good | good | non |
| 5 | 3 | 370 | 209 | good | good | good | non |
| 6 | 4 | 380 | 218 | good | good | good | non |
| 7 | 5 | 350 | 155 | good | good | good | non |
| 8 | 6 | 360 | 175 | good | good | good | non |

What is claimed is:

1. A process for the preparation of a polyimide film by melt-extrusion of a thermoplastic polyimide, comprising the steps of first applying static charge to a molten film of the thermoplastic polyimide so as to promote adhesion of the film to a cooling roller, conducting primary cooling by adhering the molten film to a cooling roller having a surface temperature in the range of from the glass transition temperature of said polyimide −50° C. to the glass transition temperature −15° C. and successively taking up the film under tension while cooling the film to 60° C. or less without bringing the film into contact with rollers.

2. The process of claim 1 wherein, after primary cooling in the extrusion process of the thermoplastic polyimide, the film is cooled to room temperature.

3. The process of claim 1 wherein the thermoplastic polyimide has recurring structural units represented by the formula (I):

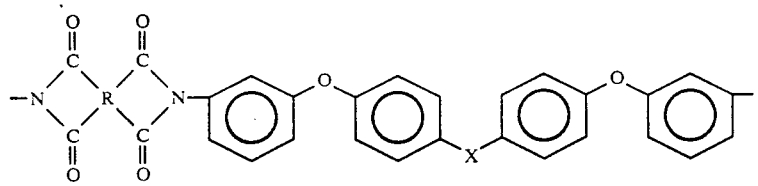

wherein R is a tetravalent radical selected from the group consisting of an aliphatic radical having at least two carbon atoms, alicyclic radical, monoaromatic radical, condensed polyaromatic radical, and a non-condensed polyaromatic radical wherein aromatic radicals are connected with each other through a direct bond or bridge radical, and X is a single bond, sulfur atom or a divalent radical selected from the group consisting of sulfone, carbonyl, isopropylidene and hexafluoroisopropylidene.

4. The process of claim 1 wherein, in the formula (I) representing the recurring structural units of the polyimide, R is a tetravalent radical selected from

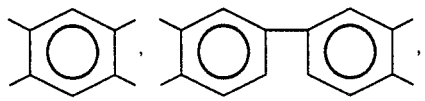, 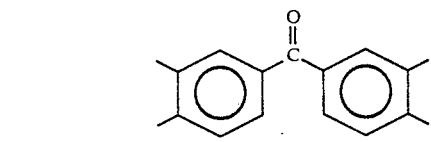,

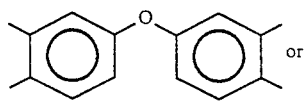 or

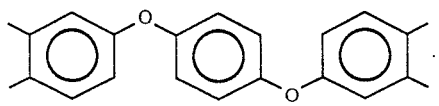

5. The process of claim 1 wherein the thermoplastic polyimide has recurring structural units represented by the formula (II):

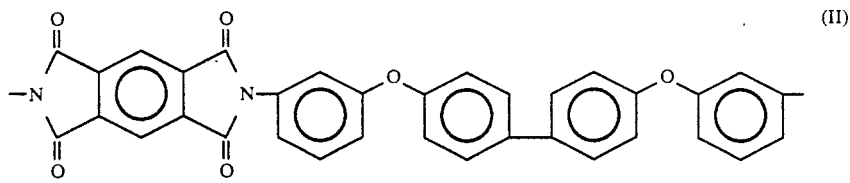 (II)

6. The process of claim 1 wherein the thermoplastic polyimide has recurring structural units represented by the formula (III):

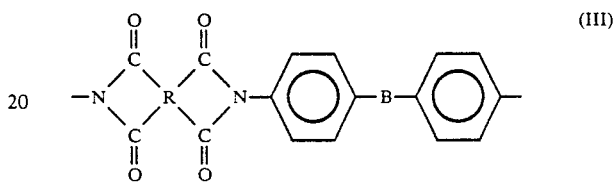 (III)

wherein B is a sulfur atom, oxygen atom, or a divalent radical selected from sulfone, methylene, ethylidene, isopropylidene or hexafluoroisopropylidene, and R is represented by the formula (IV):

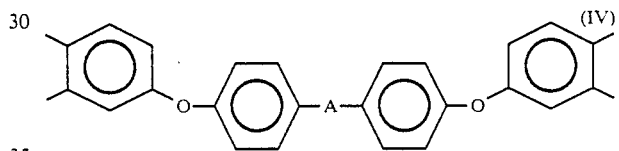 (IV)

wherein A is a sulfur atom or a divalent radical selected from the group consisting of sulfone, methylene, ethylidene, isopropylidene and hexafluoroisopropylidene.

* * * * *

UNITED STATES PATENT AND TRADEMARK OFFICE
CERTIFICATE OF CORRECTION

PATENT NO. : 5,037,587

DATED : August 6, 1991

INVENTOR(S) : Masumi SARUWATARI ET AL.

It is certified that error appears in the above-identified patent and that said Letters Patent is hereby corrected as shown below:

On the Title page,

Please add the following Priority Data:

-- [30]              Foreign Application Priority Data

July 17, 1989 [JP]   Japan...........................1-182461 --

Signed and Sealed this

Sixth Day of April, 1993

*Attest:*

STEPHEN G. KUNIN

*Attesting Officer*    Acting Commissioner of Patents and Trademarks